US006385356B1

(12) United States Patent
Jopson et al.

(10) Patent No.: US 6,385,356 B1
(45) Date of Patent: May 7, 2002

(54) METHOD AND APPARATUS FOR COMPENSATING FOR HIGHER ORDER PMD IN A FIBER TRANSMISSION SYSTEM

(75) Inventors: Robert M. Jopson; Herwig Kogelnik, both of Rumson; Lynn E. Nelson, Monmouth Beach, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/468,968

(22) Filed: Dec. 22, 1999

Related U.S. Application Data

(60) Provisional application No. 60/150,381, filed on Aug. 23, 1999.

(51) Int. Cl.[7] .................................................. G02B 6/00
(52) U.S. Cl. ......................... 385/11; 359/161; 359/156
(58) Field of Search ............................. 385/11, 29, 123; 359/156, 161, 192

(56) References Cited

U.S. PATENT DOCUMENTS 5,508,839 A * 4/1996 Ono ............................ 359/156

OTHER PUBLICATIONS

K.O. Hill et al., "Chirped In–Fiber Bragg Gratings for Compensation of Optical–Fiber Dispersion", in Optics Letters, vol. 19, No. 17 (Sep. 1994).
B.L. Heffner "Automated Measurement of Polarization Mode Dispersion Using Jones Matrix Eigenanalysis", in IEEE Photonics Technology Letters, vol. 4, No. 9 (Sep. 1992).
Fred Heismann "Analysis of a Reset–Free Polarization Controller for Fast Automatic Polarization Stabilization in Fiber–Optic Transmission Systems" Journal of Lightwave Technology vol. 12, No. 4 (Apr. 1994).
Takashi Ono et al., "Polarization Control Method for Suppressing Polarization Mode Dispersion Influence in Optical Transmission Systems" Journal of Lightwave Technology, vol. 12, No. 5 (May 1994).
Craig D. Poole and Jonathan Nagle, "Polarization Effects in Lightwave Systems" in III A Optical Fiber Telecommunication Chap. 6 (1997).
A.H. Gnauck and Robert M. Jopson, "Dispersion Compensation for Optical Fiber Systems" in III A Optical Fiber Telecommunication Chap. 7 (1997).

* cited by examiner

*Primary Examiner*—Cassandra Spyrou
*Assistant Examiner*—Fayez Assaf
(74) *Attorney, Agent, or Firm*—Moser, Patterson & Sheridan, L.L.P.

(57) ABSTRACT

In an optical fiber transmission system, higher order PMD compensation is realized with a sweeper device at the input to the fiber which converts the polarization of the light beam into a frequency dependent polarization whose rate of change is similar to the rate of change of one of the PSPs of the fiber. The frequency dependent polarization of the light beam is then aligned with one of the frequency-dependent PSPs at the input of the fiber. Furthermore, differential group delay dispersion for a given frequency can be reduced by employing a chromatic dispersion compensator prior to the receiver end of the fiber transmission system. Control of the polarization of the light beam can be facilitated by monitoring PMD in the system, or alternatively, monitoring an effect of PMD in the system, such as bit error rates.

16 Claims, 9 Drawing Sheets

FIG. 9A $$\bar{T}1 = \begin{bmatrix} \frac{1}{\sqrt{2}} \\ \frac{1}{\sqrt{2}} \\ 0 \end{bmatrix} \quad \bar{T}2 = \begin{bmatrix} 0 \\ 0 \\ 1 \end{bmatrix} \quad \bar{T}1 = \begin{bmatrix} \frac{1}{\sqrt{2}} \\ \frac{-1}{\sqrt{2}} \\ 0 \end{bmatrix}$$

FIG. 9B $$\bar{S}1 = \begin{bmatrix} 1 \\ 0 \\ 0 \end{bmatrix} \quad \bar{S}2 = \begin{bmatrix} 0 \\ 1 \\ 0 \end{bmatrix} \quad \bar{S}3 = \begin{bmatrix} 0 \\ 0 \\ 1 \end{bmatrix}$$

FIG. 9C $$R = \begin{bmatrix} \frac{1}{\sqrt{2}} & 0 & \frac{1}{\sqrt{2}} \\ \frac{1}{\sqrt{2}} & 0 & \frac{-1}{\sqrt{2}} \\ 0 & 1 & 0 \end{bmatrix}$$

METHOD AND APPARATUS FOR COMPENSATING FOR HIGHER ORDER PMD IN A FIBER TRANSMISSION SYSTEM

CROSS REFERENCE TO RELATED APPLICATION

This application claims the benefit of U.S. Provisional Application No. 60/150,381, filed on Aug. 23, 1999.

FIELD OF THE INVENTION

The present invention relates to compensating for polarization mode dispersion in a fiber transmission system. More specifically, the present invention relates to compensating for higher order polarization mode dispersion and in one illustrative embodiment the compensation is performed at the front end of the fiber transmission system.

BACKGROUND OF THE INVENTION

Optical telecommunications generally involves the use of light modulated with data, transmitted through optical fibers. As the light propagates through the fiber, its signal characteristics may become distorted by the fiber in a number of ways. One type of distortion is known as polarization mode dispersion, or "PMD".

PMD refers to an effect that an optical device, such as a span of optical fiber, has on the separate polarizations of a light beam. A light beam can be approximated as having electrical components that vibrate at right angles to the direction of travel. In the simple case the polarization or state of polarization of the light beam can be thought of as the direction of these right angle vibrations. In the more general case, these components are superimposed in a more complex way. As shown in FIG. 1, within a short optical fiber section 10, an orthogonal set of two polarized waveguide modes 20 and 30 can be found which have electric field vectors aligned with the symmetry axes of the fiber. The polarization of a light beam propagating through the fiber section can be represented by the superposition of vector components aligned with these polarization waveguide modes of the fiber as shown in FIG. 2. In FIG. 2, the polarization waveguide modes 20 and 30 are shown as two axes. The input polarization 40 is represented as the vector sum of two components 50 and 60 which are aligned with the polarization waveguide modes of the fiber section.

In ideal fiber, which has a perfect circular cross-section and is free from external stresses, the propagation properties of the two polarized waveguide modes are identical. However, imperfections introduced in the manufacturing process may result in fiber that is not perfectly circular. In addition, fiber that has been installed may suffer from external stresses arising from pinching or bending. These manufacturing imperfections and external stresses cause the two polarized waveguide modes to have different propagation characteristics which in turn gives rise to polarization mode dispersion, or "PMD".

A convenient way to represent the effects of PMD caused by a particular optical device or span of optical fiber uses Stokes space, a three-dimensional geometrical space, and the Poincaré sphere, a sphere within Stokes space where every possible polarization state maps to a specific (and different) point on the sphere. Three axes, S1, S2, and S3, define this three dimensional space and any polarization can be described in reference to these axes, in other words by its S1, S2, and S3 components. The S1, S2, and S3 components of a polarization are called its Stokes parameters.

PMD affects the propagation of a light beam with respect to both time and frequency. With respect to time, PMD causes the two vector components comprising the polarization of the light beam to propagate down the two polarization waveguide modes at different velocities and thus separate in time as seen in FIG. 3. In FIG. 3, the two components 50 and 60 of input polarization 40 are aligned with polarization waveguide modes 20 and 30. This time gap is known as the differential group delay, "DGD", represented as $\Delta\tau$. The difference of arrival times of the two pulses results in a broadening of the combined signal. The larger the differential group delay the broader the combined pulse. This in turn restricts the bit rate that can be transmitted through the fiber. With respect to frequency, the output polarization will vary as a function of the optical carrier frequency in a periodic fashion when the polarization of the light beam at the input remains fixed.

In general, an optical fiber will not have identical imperfections such that the two polarized wave-guide modes have the same orientation along the entire length of the fiber. However, most fibers can be modeled as a concatenation of many smaller fiber sections, each of which is considered to have a uniform birefringence and thus impart a uniformly oriented PMD to the light beam travelling through it. Birefringence refers to the difference in indices of refraction or light velocity of the two polarization components of a fiber. The effect over the full span is analyzed by considering the smaller lengths to be joined such that their respective axes are oriented at random angles relative to each other.

Although the behavior of a real length of fiber is more complex than that of a small section, over a narrow frequency range the PMD effects of both the real length and simple short length fibers are similar. However, instead of two polarization waveguide modes, the real length of fiber can be viewed as having orthogonal pairs of special polarizations, called the principal states of polarization ("PSP") which, in general, vary with frequency. When a pulse is launched into a fiber with some optical power on each PSP, the output will consist of two light pulses separated in time by the differential group delay. In the absence of polarization-dependent loss, each optical device or span of fiber has a different orthogonal pair of PSP's for each frequency. Polarization dependent loss refers to the difference in the amount of loss a light wave can experience with changes in its state of polarization.

As stated above, even for a simple short fiber section, PMD causes the polarization of the light beam at the output of the fiber section to vary with frequency. The frequency effect of PMD can be easily seen when displayed on the Poincaré sphere. As shown in FIG. 4, for a light beam having a fixed input polarization 40, the output polarization 70 of the light beam moves locally in a circle on the surface of the Poincaré sphere as the frequency of the light beam is varied from $\omega_1$ to $\omega_2$ to $\omega_3$.

Using Stokes space and the Poincaré sphere, the various effects of PMD for a given optical device or span of fiber may be compactly represented using a single, three-dimensional vector referred to as the PMD vector or $\underline{\Omega}$. The magnitude of the PMD vector, $|\underline{\Omega}|$, describes the time effect of PMD and the rate of rotation of the output polarization with respect to frequency. In other words, $|\underline{\Omega}|=\Delta\tau$. The direction of the PMD vector points along one of the PSPs for the fiber. This can be represented mathematically as $\underline{\Omega}=\Delta\tau\underline{q}$, where $\underline{q}$ is the unit vector indicating the direction of one of the PSPs.

Since PMD can limit the transmission bandwidth of optical fiber, measurement of the PMD of a span of fiber is necessary to determine the span's data transmission capability as well as to provide information for compensating the PMD in the span. There are many known methods for measuring PMD. Some methods only provide a measurement of the magnitude of PMD, i.e., the differential group delay, and do not provide information on the PMD vector characteristics. A method for measuring PMD vectors is the Poincaré Sphere Technique, or "PST". For each PMD determination, two different input polarizations are injected into an optical device under test, such as a fiber section, at each frequency of a frequency pair and the output polarizations are measured. Specifically, a light beam having a first input polarization is injected at the first frequency of the frequency pair into an optical device under test and the output polarization measured. Then, a light beam having this same first input polarization is injected at the second frequency of the frequency pair into the device under test and a second output polarization is measured. Third, a light beam having a second input polarization is injected at the same first frequency of the frequency pair into the device under test and a third output polarization is measured. Finally, a light beam having this same second input polarization is injected at the same second frequency of the frequency pair into the device under test and a fourth output polarization is measured. Depending on the results, a different first polarization may have to be chosen and the process repeated. The PMD for this first frequency pair is then calculated. This same procedure is used to determine the PMD for the other frequency pairs remaining in the frequency range being tested.

FIG. 5 shows a block diagram of a general apparatus capable of carrying out the previously described method. Control block 550, which could be a computer, directs tunable laser source 510 to sequentially emit light beams of various frequencies, such as the first and second frequencies described above. Control block 550 also directs polarizing device 520 to impart one of several polarizations to the beams emitted from 510, such as the first and second polarizations described above. Polarizing device 520 could consist of one or more linear or circular polarizers, with the number and type of polarizers depending upon the requirements of the specific PMD measurement method used. The light beams pass through the device being tested 530, such as a section of fiber, and are captured in polarization measuring device 540, which could be a polarimeter. Polarization measuring device 540 then measures the output polarization states of the light beams and passes this information to analysis block 560. Analysis block 560, which could be a computer, then calculates the PMD according to the algorithm used by the specific method.

Other methods have been proposed to determine the full vector characteristics of PMD for deducing the effects of higher order PMD. Higher order PMD describes the change of the PMD vector with frequency. Knowledge of the higher order PMD effects is necessary where there are significant changes of the PMD vector across the signal frequency bandwidth. Second order PMD specifically, reflects the linear frequency dependence of both the magnitude and direction of $\underline{\Omega}$. In other words, second order PMD manifests in a linear change of the differential group delay and PSPs with frequency.

This later set of methods of determining higher order PMD are described in U.S. patent application Ser. No. 09/395,238, filed on Sep. 13, 1999 and entitled Apparatus And Method For Improving The Accuracy Of Polarization Mode Dispersion Measurements, hereby incorporated by reference as if fully set forth herein, and U.S. patent application Ser. No. 09/390,033, filed on Sep. 3, 1999 and entitled Method For Measurement Of First- And Second Order Polarization Mode Dispersion Vectors In Optical Fibers. Both of these are commonly assigned with the subject invention.

The ability to measure PMD or its effects is one thing, to correct for PMD is another matter. Existing methods for compensating for PMD are known. However, they are all limited in scope. One such known method is described in Takashi Ono et al., "Polarization Control Method for Suppressing Polarization Mode Dispersion Influence in Optical Transmission Systems," in Journal of Lightwave Technology vol. 12, No. 5 pp 891–897 (1994), hereby incorporated by reference as if fully set forth herein. Ono teaches that for a given optical frequency the differential group delay caused by PMD has no effect on the signal when the light beam is launched with a polarization that is aligned with one of the two input PSPs of the optical fiber. By launching at the PSP there is effectively only one propagation component. Therefore there can be no difference in velocity between the two components and this effect of PMD is avoided.

Ono however, does not eliminate the effects of second and higher order PMD. In a real optical system, a signal has a bandwidth or range of optical frequencies, while the signal is usually launched with a single polarization. Since the PSP of the optical fiber varies with frequency, the polarization of the light beam loses its alignment with the PSP across the signal bandwidth. This effect is not compensated by Ono's method.

SUMMARY OF THE INVENTION

In accordance with the present invention first and higher order PMD in an optical fiber is compensated by aligning the polarization of an input light beam to the fiber, with one of the PSPs of the waveguide, regardless of the frequency of the light beam. The input light beam is first passed through a device which varies the polarization of the light beam with its change of optical frequency so that the polarization remains aligned with the PSP of the optical fiber. This device allows for higher order PMD compensation.

In one preferred embodiment, an adjustable device is used for transforming the polarization of the light beam as a function of frequency as required. Since the PMD of a fiber is a function of the frequency and the carrier frequency is different for different channels, it is necessary to adjust the rate of change of polarization of the transferred light beam according to the carrier frequency selected.

In another preferred embodiment applying known methods for chromatic dispersion compensation may also compensate the change in differential group delay arising from the change in frequency. Any one of known methods for chromatic dispersion compensation can be applied at the output of the optical fiber, in advance of a receiver.

BRIEF DESCRIPTION OF THE DRAWINGS

FIG. 9A illustrates a set of three exemplar Stokes vectors describing a fiber's PMD.

FIG. 9B illustrates a set of three exemplar Stokes vectors describing the sweeping input polarization to a polarization controller.

FIG. 9C illustrates the Muller matrix R, relating to the vectors of FIGS. 9A and 9B.

DETAILED DESCRIPTION OF THE INVENTION

As stated above, higher order PMD describes the change of the PMD vector both in magnitude and direction with frequency. Higher order PMD is described by the coefficients of a Taylor series in $\Delta\omega$ of the PMD vector $\underline{\Omega}$ evaluated at the carrier frequency $\omega_0$. For ease of presentation we limit our discussion to second order PMD which reflects the linear frequency dependence of both the magnitude and direction of $\underline{\Omega}$. This can be represented mathematically as $\underline{\Omega}(\omega)=\underline{\Omega}(\omega_0)(\omega-\omega_0)$ where $\underline{\Omega}_\omega$ is the second order PMD vector.

The two effects of second order PMD, (i) linear changes in the direction of the PMD vector as a function of frequency and (ii) linear changes in the magnitude of the PMD vector as a function of frequency, can be represented mathematically as $\underline{\Omega}_\omega=\Delta\tau_\omega\underline{q}+\Delta\tau\underline{q}_\omega$. In other words, the PMD vector is a linear function of frequency, and its derivative, $\underline{\Omega}_\omega$, represents the change of differential group delay as a function of frequency along a particular PSP and the change of the direction of the PSP with frequency.

When higher-order effects are ignored, PMD is characterized by the first order PMD equation, $\underline{\Omega}=\Delta\tau\underline{q}$. Compensation schemes for first order PMD are well known. For example, a light beam with a fixed frequency $\omega$ may be launched into a fiber with a polarization that is aligned with the direction of one of the PSPs of the fiber at $\omega$. When second-order PMD is significant but $\underline{q}_\omega=0$, a light beam could be input to the fiber with its polarization aligned with one of the PSP's of the fiber. Then $\Delta\tau_\omega$ could be treated as chromatic dispersion and compensated using well known compensating methods. See A. H. Gnauck & R. M. Jopson, "Dispersion Compensation for Optical Systems," in *Optical Fiber* Telecommunications Vol. IIIA, pp. 162–195 (ed. I. P. Kaminov and T. L. Koch, Academic Press, New York, 1997) hereby incorporated by reference, as if fully set forth herein.

In reality, though, $\underline{q}_\omega$, the change in direction of the PMD vector as a function of frequency, is not zero and the second component to the PMD vector must also be considered. This second component reflects that the PSP of the fiber is changing across the bandwidth of the signal. Consequently, it is no longer a simple matter to launch the light beam at the input PSP of the fiber over the whole signal bandwidth.

Figure 1:
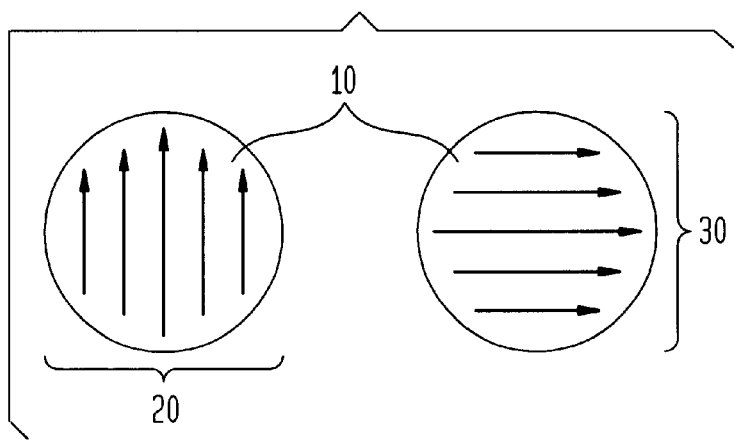
FIG. 1 illustrates the orthogonal set of waveguide modes corresponding to a section of an optical fiber.
Figure 2:
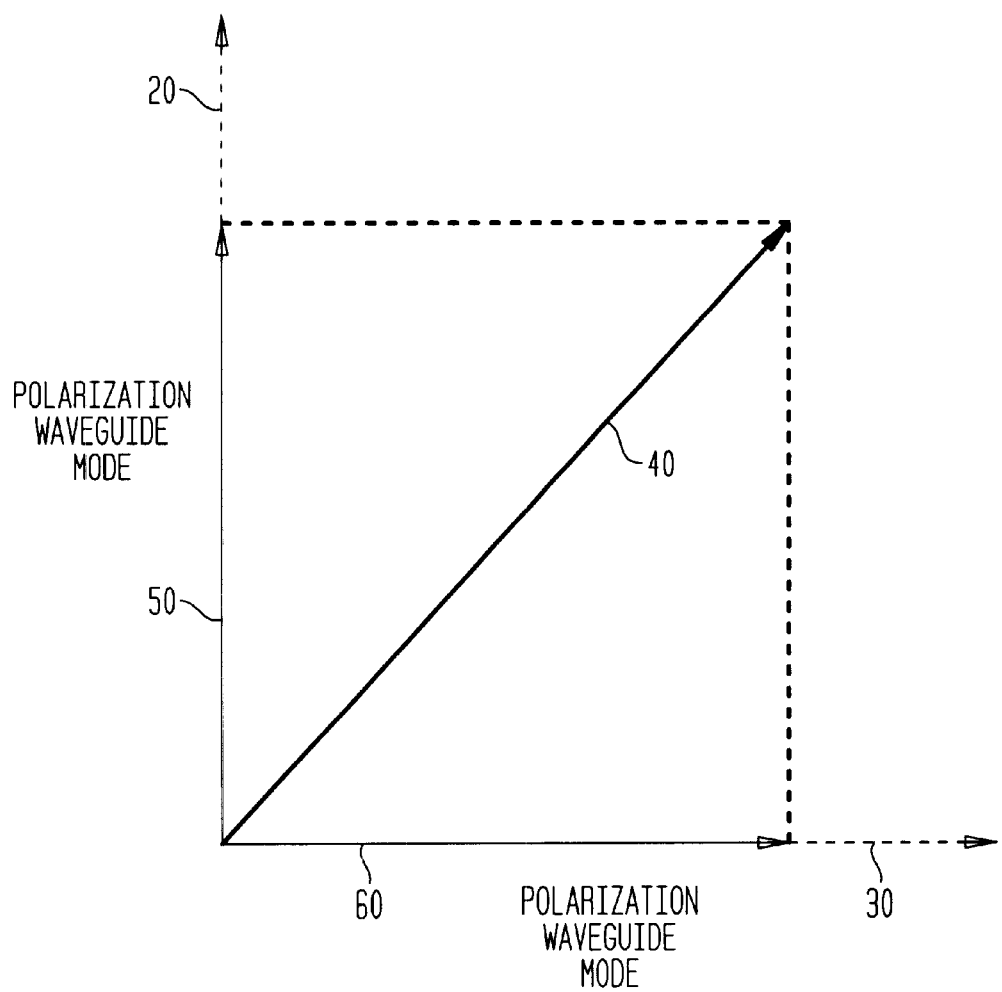
FIG. 2 is a graphical illustration of the representative vector of the polarization of a light beam propagating through a waveguide and its vector components aligned with the orthogonal set of waveguide modes.
Figure 3:
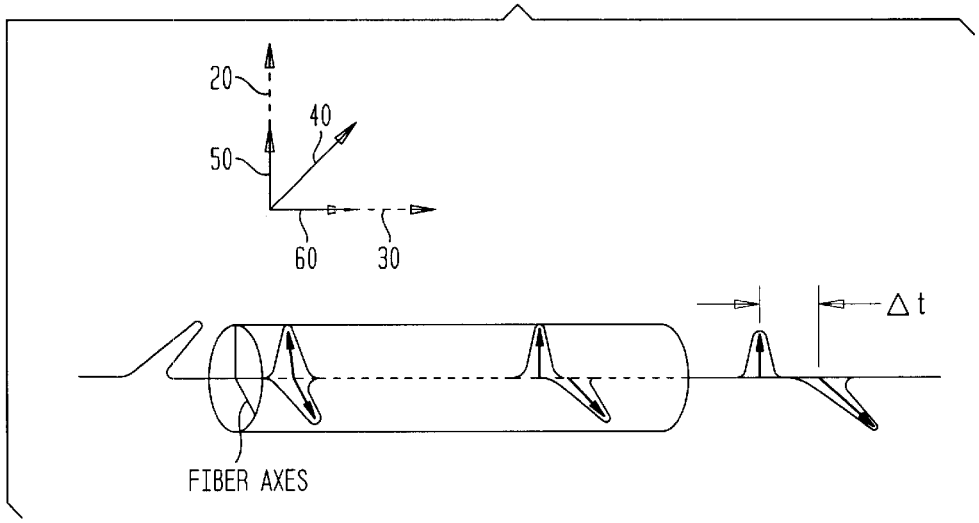
FIG. 3 illustrates the differential group delay between the components of the polarization vector of a light beam subject to PMD.
Figure 4:
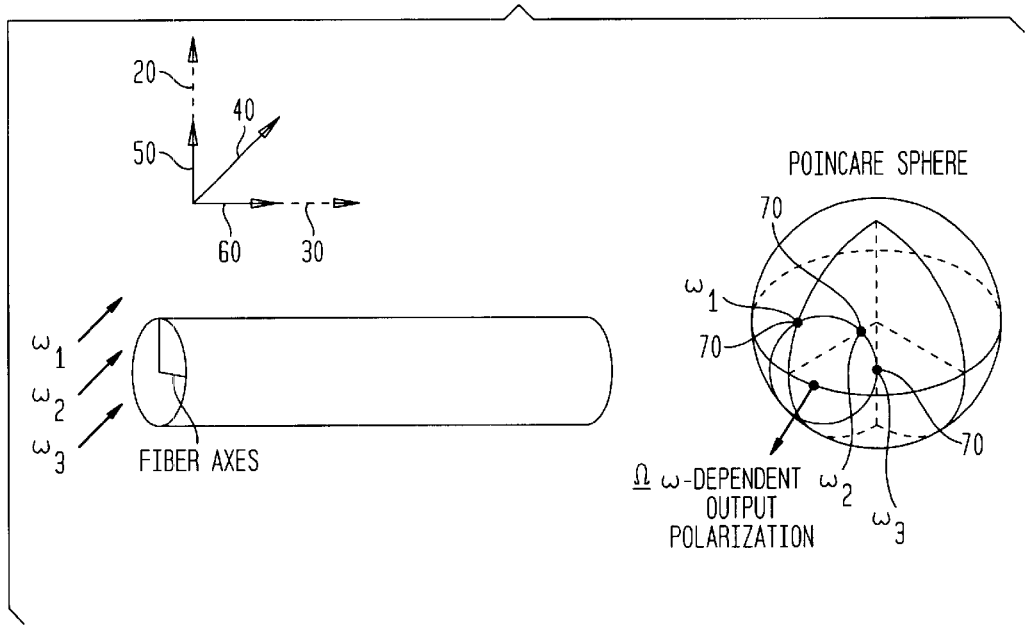
FIG. 4 illustrates the frequency dependence of output polarization of a light beam and how it is represented in a Poincaré Sphere.
Figure 5:
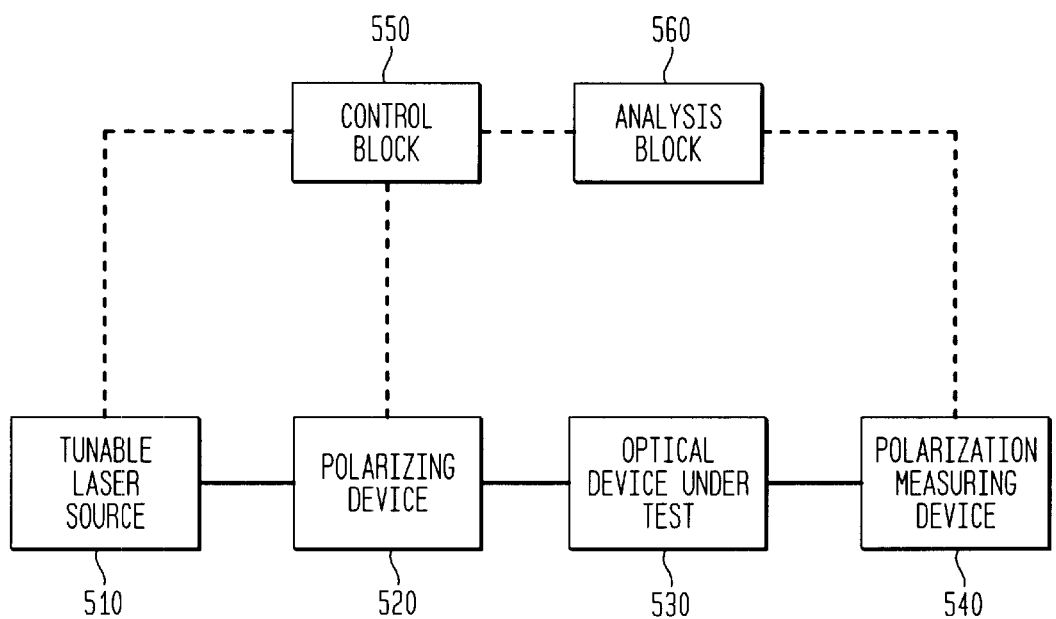
FIG. 5 is a block diagram of an apparatus for measuring PMD in an optical fiber.
Figure 6A:
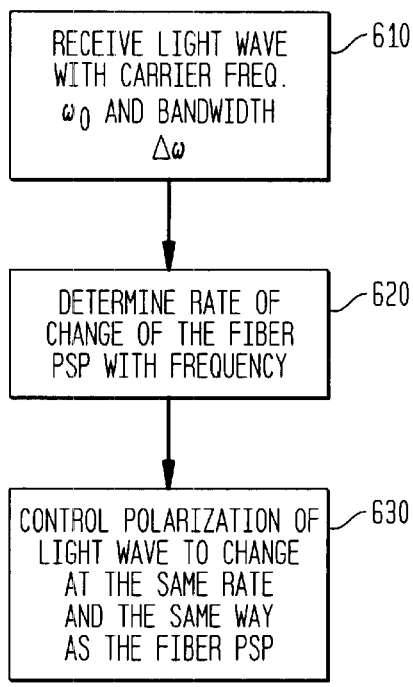
FIG. 6A is a flow chart of one embodiment of the method of the present invention.
Figure 6B:
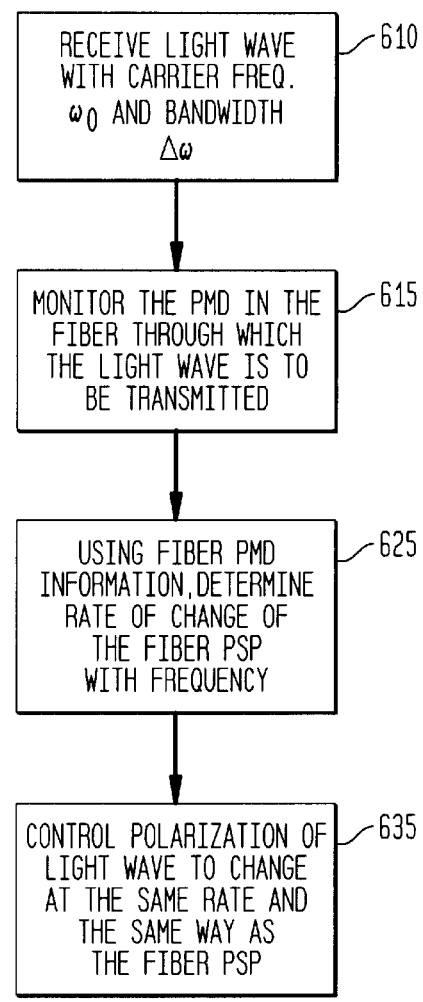
FIG. 6B is a flow chart of a second embodiment of the method of the present invention.

In accordance with the present invention a method for compensating for higher order PMD is taught. With reference to FIG. 6A, the first step 610 involves receiving a light wave with carrier frequency $\omega_0$ and bandwidth $\Delta\omega$ so that the polarization of the light wave can be aligned with the frequency dependent PSP of the optical fiber through which the light wave is to pass. To properly orient the polarization of the light wave it is necessary to determine the PMD in the fiber, 620. This information may be known a prior, as assumed by the flow chart of FIG. 6A. Alternatively, the PMD of the fiber may be directly monitored as suggested by blocks 615 and 625 in FIG. 6B. This can be done in many different ways. Some of these methods are described in U.S. patent application Ser. No. 09/395,238, filed on Sep. 13, 1999 and entitled Apparatus And Method For Improving The Accuracy Of Polarization Mode Dispersion Measurements, and U.S. patent application Ser. No. 09/390,033, filed on Sep. 3, 1999 and entitled Method For Measurement Of First- And Second Order Polarization Mode Dispersion Vectors In Optical Fibers, supra.

Whether the PMD information is known a priori, or is dynamically measured, it is not always necessary to measure the actual PMD values. One may also detect an effect of the fiber PMD, such as bit error rates, with the objective that when the polarization of the light wave is properly oriented that effect will be eliminated or reduced, as desired.

Lastly, the polarization of the light wave is manipulated so that it too varies with the change in carrier frequency, the same way that the fiber PSP varies with the carrier frequency, 630. Furthermore, the polarization of the light wave is aligned with one of the PSPs of the fiber. By launching the light wave into the fiber along one of the PSPs of the fiber at more than one frequency, coupling to the other fiber PSP is reduced, if not entirely avoided. This reduces the effects, or entirely eliminates distortion of the pulse shape. As described below, there may be advantages to selecting one or the other of the two PSPs with which to align the light wave polarization.

In accordance with the present invention, a system for implementing higher order PMD compensation as briefly described above, is illustratively shown in FIG. 7. A polarization controller ("PC") 720 is used at the input to fiber 730 to control the polarization of the light wave 710, as described above. PC 720 is designed to sweep an input Stokes vector to match a principal state of the fiber 730 as a function of angular frequency $\omega$. It is a matter of design whether the polarization of the output light beam from PC 720 varies for all frequencies, or only for a limited plurality of the optical frequencies so as to satisfactorily reduce the impact of the frequency dependent principal states of polarization.

As alluded to above, the PC 720 of the present invention has two tasks to complete. The first is to create a sweeping polarization of the light beam of the required magnitude. The second is to align the polarization of the light beam with one of the sweeping PSPs of the fiber 730. To facilitate the following discussion we will refer to FIG. 10 where these two tasks are performed by separate devices. Thus the sweeping function is performed by sweeper controller ("SC") 1010 and the alignment function is performed by PC 1020.

Figure 8A:
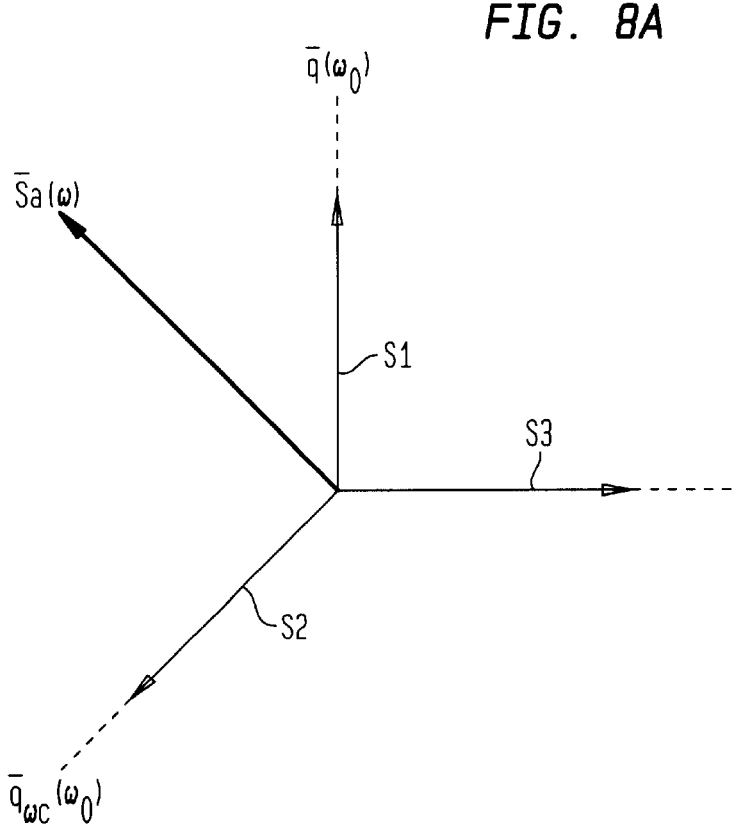
FIG. 8A depicts the PMD vector of the polarization controller of the inventive system plotted in a Cartesian coordinate system in Stokes space.
Figure 10:
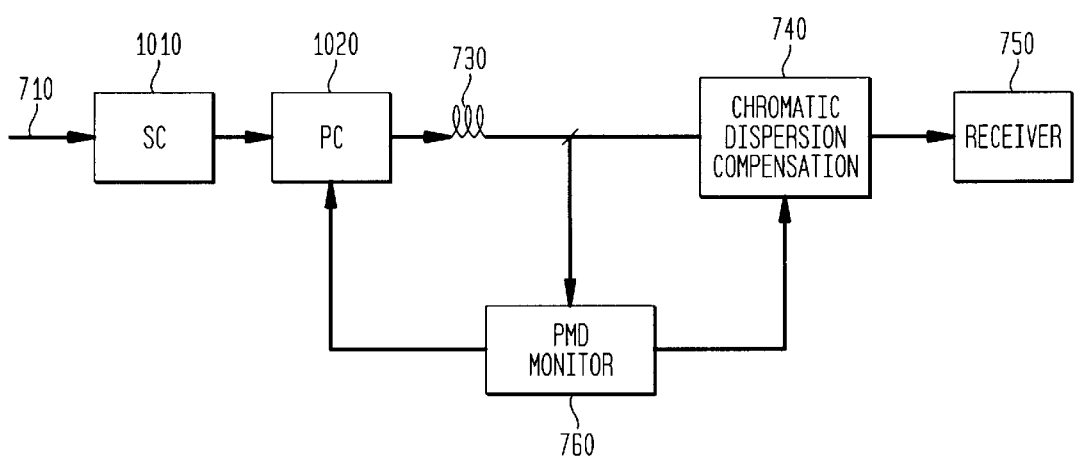
FIG. 10 is a schematic of one embodiment of the system of the present invention, separately showing the sweeper control and polarization control devices.

With reference to FIG. 10, the following describes in further detail the sweeping function of SC 1010. Specifically, the combination of SC 1010 and PC 1020 is designed to introduce an output Stokes vector T(ω) aligned with the direction of the PMD vector $\Omega_f(\Omega)$ at the input to the fiber. Since the input PMD vector is frequency dependent, the output of PC 1020 must be frequency dependent as well. Referring to FIG. 8A, the output Stokes vector of $\underline{S}_c(\omega)$ 1010 is plotted in Stokes space. The direction of $\underline{S}_c(\omega)$ is designated as $\underline{q}_c(\omega)$, a frequency dependent sweep in the plane of $\underline{q}_c(\omega_0)$ and $\underline{q}_{\omega c}(\omega_0)$. Three reference vectors at the input of PC 1020 are chosen such that they are represented in Stokes space as $\underline{S1}=\underline{q}_c(\omega_0)$, $\underline{S2}=(\underline{q}_{\omega c}(\omega_0))/(|\underline{q}_{\omega c}(\omega_0)|)$; and $\underline{S3}=\underline{S1} \times \underline{S2}$. PC 1020 transforms these vectors to corresponding Stokes vectors $\underline{T}_1, \underline{T}_2, \underline{T}_3$ at its output.

Figure 8B:
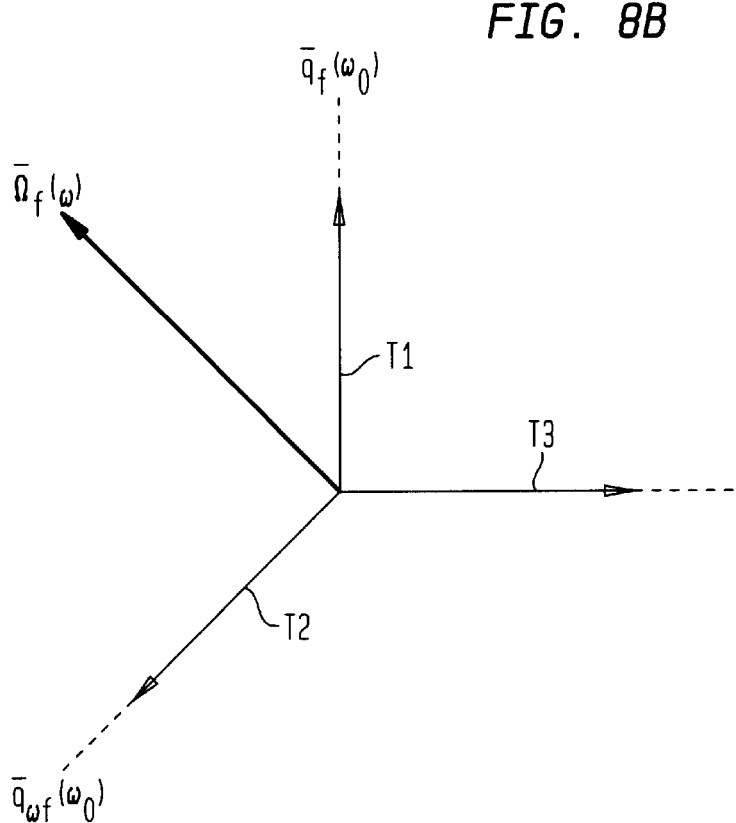
FIG. 8B depicts the PMD vector of the input fiber through which a light beam is to be transmitted plotted in a Cartesian coordinate system in Stokes space.

Similarly, FIG. 8B depicts the PMD vector $\Omega_f(\Omega)$, at the input to fiber 730. This vector is also frequency dependent and sweeps in the plane of $\underline{q}_f(\omega_0)$ and $\underline{q}_{f\omega}(\omega_0)$. Having plotted these two vectors it is easier to understand that the object of PC 1020 is to match these two vectors and the sweep planes to each other. In other words they should be aligned and in phase with each other such that $\underline{T1}=\underline{q}_f$; $\underline{T2}=(\underline{q}_{\omega f}/|\underline{q}_{\omega f}|)$; $\underline{T3}=\underline{T1} \times \underline{T2}$. This is accomplished by producing a Muller matrix R relationship between $\underline{S}$ and $\underline{T}$, such that $\underline{T}=R\underline{S}$. Illustrative values for these vectors are shown in FIGS. 9A, 9B and 9C.

An algorithm used to determine the required matrix elements of R is a generalization of the algorithm used in the Muller Matrix Method. It allows the transformation of any given orthogonal set $S_1, S_2, S_3$ at the input of PC 1020 to the required set $T_1, T_2, T_3$. The matrix R is determined in two steps $R_t$ and $R_s$ such that $R=R_t R_s$. The matrix elements of $R_s$ are determined from the input vector components $R_{sij}=S_{ij}$ and the elements of $R_t$ are determined from the required output vector components $R^T_{tij}=T_{ij}$, where the first index i, of S and T, corresponds to three reference vectors, i=1, 2, 3, and the second index j, refers to their vector components j=1, 2, 3.

Once the desired elements of R are known, the polarization controller 1020 can be set by known algorithms. One such algorithm is described in Fred Heismann, "Analysis of a Reset-Free Polarization Controller for Fast Automatic Polarization Stabilization in Fiber-optic Transmission Systems," in Journal of Lightwave Technology, vol. 12 No. 4 pp 690–699 (1994), hereby incorporated by reference as if fully set forth herein. One physical implementation of the PC 1020 is Heismann's implementation using integrated-optics waveguide technology in the electro-optic crystal LiNbO$_3$.

The function of the SC 1010 is to produce a frequency sweep of the output Stokes vector $|q_{c\omega}(\omega_0)|$ that matches the sweep of the fiber PMD vector, $|q_{f\omega}(\omega_0)|$. The SC 1010 can be implemented in many forms, including one or more sections of birefringent elements, such as birefringent fiber, trombones, or LiNbO$_3$ devices. Birefringent fibers are manufactured to have two well-oriented axes with different propagation speeds. A "trombone" consists of two polarization beam splitters with a variable delay between them. LiNbO$_3$ devices use the same technology as described above. All of these devices allow adjustability of the required sweep rate, $|q_{c\omega}(\omega_0)|$.

For the specific case of using a single birefringent fiber section as the SC 1010, the birefringent fiber is oriented so that its axis is at S1. The input light beam is then launched at S2. This will result in a sweep output dependent on ω, in the S2–S3 plane. The rate of rotation will be $\Delta \tau_{SC}$, the differential group delay at the output of SC 1010. $\Delta \tau_{SC}$ is equal in magnitude to $\Delta n L/c$, where $\Delta n$ is the differential refractive index due to the birefringence in SC 1010, L is the length of the SC 1010 device and c is the speed of light.

As discussed above, one of the constituent effects of PMD reflected in the second order PMD vector is the change in group delay as a function of frequency for a given PSP direction. This PMD effect is very similar to chromatic dispersion, a change of the group velocity of light with frequency, for which methods of compensation are well known. While this effect may be small, it would be advantageous to compensate for this effect as well. Thus in one preferred embodiment of the present invention known methods for compensating for chromatic dispersion may be incorporated with the foregoing steps to compensate for this second order PMD effect, as shown in block 640 of FIG. 6C.

Figure 7:
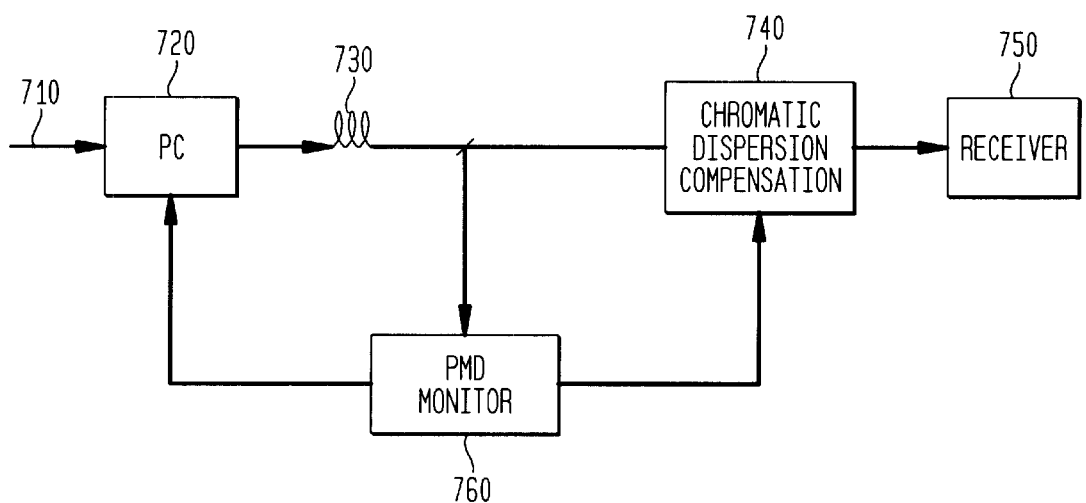
FIG. 7 is a schematic of one embodiment of the system of the present invention.

As shown in FIG. 7 this compensation is accounted for by device 740, which can be applied to the light beam anywhere along the transmission path prior to the receiver to compensate for both chromatic dispersion and the differential group delay dispersion, $\Delta \tau_\omega$. PMD monitor 760 may be used anywhere along the fiber span to detect the PMD in the fiber 730. While the $q_\omega$ information is provided to PC 720, the $\Delta \tau_\omega$ component of the PMD vector is provided to chromatic dispersion compensator 740.

As stated above, it is not necessary that PMD monitor 760 actually detect the PMD. It will be sufficient to detect any phenomenon, which can be related to the magnitude of the PMD vector. This may include monitoring the bit error rates in the output signal, or photodetection of any one or more RF components of the light beam signal.

In one embodiment of the present invention, compensator 740 is a dispersion-compensating fiber or a chirped fiber Bragg grating. See K. O. Hill, et al., "Chirped in-fiber Bragg gratings for compensation of optical-fiber dispersion," Optics Letters, Vol. 19, No. 17, pp. 1314–1316 (1994), hereby incorporated by reference as if fully set forth herein.

Alternative embodiments for monitoring the PMD in fiber 730 in accordance with the present invention include the Degree of Polarization, described in F. Roy, et al., "A Simple Dynamic Polarization Mode Dispersion Compensator," Technical Digest from the Optical Fiber Communications Conference 1999; Jones Matrix Eigenanalysis, described in B. L. Heffner, "Automated Measurement of Polarization Mode Dispersion Using Jones Matrix Eigenanalysis," Photonics Technology Letters, Vol. 4, No. 9, pp. 1066–1069 (1992); Muller Matrix Method, described in U.S. patent application Ser. No. 09/390,033, supra; and polarization-dependent signal delay method, described in R. M. Jopson, et al., "Vector Measurement of Polarization Mode Dispersion Using the Polarization-Dependent Signal Delay Method," LEOS' 99 Annual Meeting, Postdeadline paper PD1.1, Nov. 8–11 (1999). The foregoing references are all hereby incorporated by reference as if fully set forth herein.

Figure 6C:
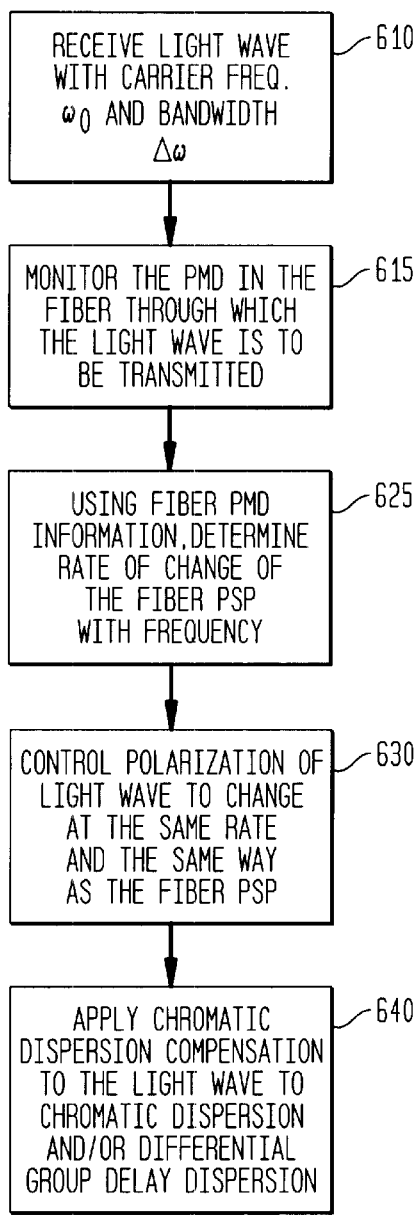
FIG. 6C is a flow chart of a third embodiment of the method of the present invention.
Figure 6D:
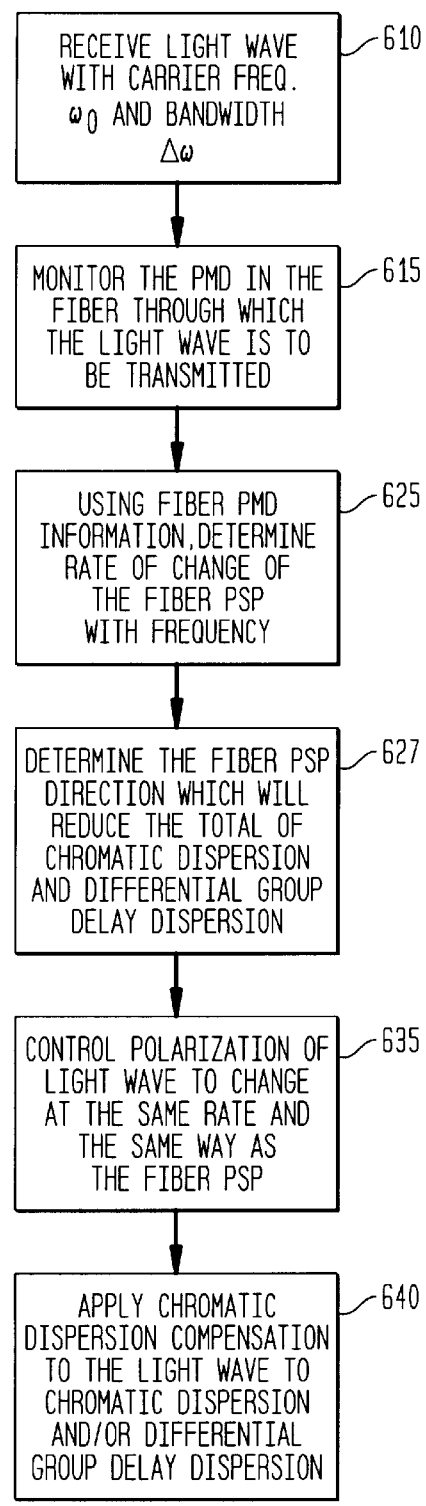
FIG. 6D is a flow chart of a fourth embodiment of the method of the present invention.

It should be noted that depending upon whether the input light beam is launched in alignment with one or the other of the PSPs, the change of the differential group delay as a function of frequency $\Delta \tau_\omega$, has equal magnitude but opposite sign. Since, as explained above, $\Delta \tau_\omega$ is similar in character to chromatic dispersion D of the fiber, there is an additive effect of $D+\Delta \tau_\omega$, where the + refers to one or the other of the PSP's. Thus when applying chromatic dispersion compensation in accordance with the present invention it may be advantageous to choose to launch along the PSP that minimizes the sum of the chromatic dispersion and the change in group delay as a function of frequency. In other words choose the PSP that will result in a differential group delay dispersion whose sign is opposite that of D so that the magnitude of the sum of the two is $|D|-|\Delta\tau_\omega|$. Thus in FIG. 6D, step 630 from the embodiment outlined in FIG. 6C is replaced with steps 627 and 635. In 627, the appropriate PSP direction is determined. In 635, the polarization of the light wave is aligned with the PSP in the direction as determined in the forgoing step.

By appropriately selecting the PSP direction in which to launch, it may at times be unnecessary to compensate for D or $\Delta\tau_\omega$. Alternatively, this approach can be used to reduce the amount of compensation that is necessary.

The foregoing merely illustrates the principles of the present invention. Those skilled in the art will be able to devise various modifications, which although not explicitly described or shown herein, embody the principles of the invention and are thus within its spirit and scope.

What is claimed is:

1. A method for compensating for higher order PMD in a fiber transmission system, comprising the steps of:
    receiving at a polarization controller device a light beam carrying a signal with a band of frequencies and a given polarization;
    controlling with said polarization control device said polarization of said light beam prior to an optical waveguide having frequency dependent principal states of polarization, such that said polarization of said light beam is made to vary with the frequency of said light beam and is aligned with said principal state of polarization of said optical waveguide at each frequency; and
    introducing said light beam with a frequency dependent polarization into said optical waveguide.

2. The method of claim 1 further comprising the step of monitoring said fiber transmission system.

3. The method of claim 2 wherein said monitoring step includes monitoring bit error rates at the output of said optical waveguide.

4. The method of claim 2 wherein said monitoring step includes monitoring one or more RF components of said light beam through said optical waveguide.

5. The method of claim 2 wherein said monitoring step includes monitoring the degree of polarization of said light beam.

6. The method of claim 5 wherein said monitoring PMD step includes monitoring the change in direction of the principal state of polarization with frequency.

7. The method of claim 2 wherein said monitoring step includes monitoring the PMD along said optical waveguide.

8. The method according to claim 1 wherein said higher order PMD is second order PMD.

9. The method of claim 1 further comprising the steps of:
    monitoring the PMD of said optical waveguide;
    determining from said monitoring step the principal state of polarization for each given frequency that gives rise to a differential group delay dispersion which is opposite in sign to any chromatic dispersion affecting said light beam travelling through said optical waveguide; and
    in said controlling step, aligning said polarization of said light beam with said principal state of polarization of said optical waveguide giving rise to a differential group delay dispersion opposite in sign to any chromatic dispersion affecting said light beam travelling through said optical waveguide.

10. The method of claim 9 further comprising the step of compensating for chromatic dispersion prior to receiving said light beam at the output of said optical waveguide.

11. The method of claim 1 further comprising the step of compensating for chromatic dispersion affecting said light beam, prior to receiving said light beam at the output of said optical waveguide.

12. A method for aligning the polarization of a light beam with a frequency dependent PSP of a fiber into which said light beam is to be input, said method comprising the steps of:
    adjusting said polarization of said light beam to a polarization that sweeps with frequency at a rate that matches the sweep of the PMD vector of said fiber; and
    rotating said polarization sweep to match the sweep of said frequency-dependent PSP of said fiber.

13. A polarization controller for aligning the polarization of a light beam to be input to a fiber with one of the frequency-dependent PSPs of said fiber, comprising:
    a sweeper for adjusting polarization of said light beam to a polarization that sweeps with frequency at a rate that matches the sweep of the PMD vector of said fiber; and
    a controller for rotating said polarization sweep to match the sweep of said frequency-dependent PSP of said fiber.

14. The system of claim 13 further comprising:
    a PMD monitor for determining the PMD of said system; and
    means for feeding from said PMD monitor to said polarization controller, data relating to the frequency dependent direction of a PSP of said fiber.

15. A fiber transmission system, comprising:
    a transmitter for transmitting a data carrying light beam;
    a receiver for receiving said light beam at a receiving end of said fiber transmission system;
    a span of fiber for carrying said light beam from said transmitter to said receiver; and
    a polarization controller for aligning the polarization of said light beam to be input to said fiber with a PSP of said fiber, at more than one frequency.

16. The system of claim 15 further comprising:
    a chromatic dispersion compensator; and
    means for feeding from said PMD monitor to said chromatic dispersion compensator data relating to the differential group delay dispersion in said fiber for a given carrier frequency of said light beam.

* * * * *